United States Patent [19]

Batterton et al.

[11]  4,163,626
[45]  Aug. 7, 1979

[54] ERECTION MEANS FOR A TRANSPORT TRAILER

[75] Inventors: Elmo L. Batterton; Melvin J. Lonsdale, both of Morton, Ill.

[73] Assignee: Meyer Morton Co., Morton, Ill.

[21] Appl. No.: 866,215

[22] Filed: Jan. 3, 1978

[51] Int. Cl.² .............................................. B60P 1/64
[52] U.S. Cl. .................................. 414/469; 414/919; 52/115
[58] Field of Search .............. 214/515, 512, 505, 501; 298/19 B; 254/122, 124, 85; 52/115, 116, 119

[56] References Cited

U.S. PATENT DOCUMENTS

| 2,887,191 | 5/1959 | Lovell | 52/119 X |
| 2,934,226 | 4/1960 | Dempster et al. | 214/82 |
| 3,145,865 | 8/1964 | Rogers | 214/512 |
| 3,155,248 | 11/1964 | Haller | 214/501 X |
| 3,547,291 | 12/1970 | Batterton et al. | 214/515 |

FOREIGN PATENT DOCUMENTS 623956  7/1961  Canada ................................. 298/19 B Primary Examiner—Albert J. Makay
Attorney, Agent, or Firm—Hill, Van Santen, Steadman, Chiara & Simpson

[57] ABSTRACT

Erection means for a transport trailer which hauls an elongated object of relatively large cross-section in horizontal position and then with the aid of hydraulic jacks stands the object erectly on a preformed foundation.

7 Claims, 6 Drawing Figures

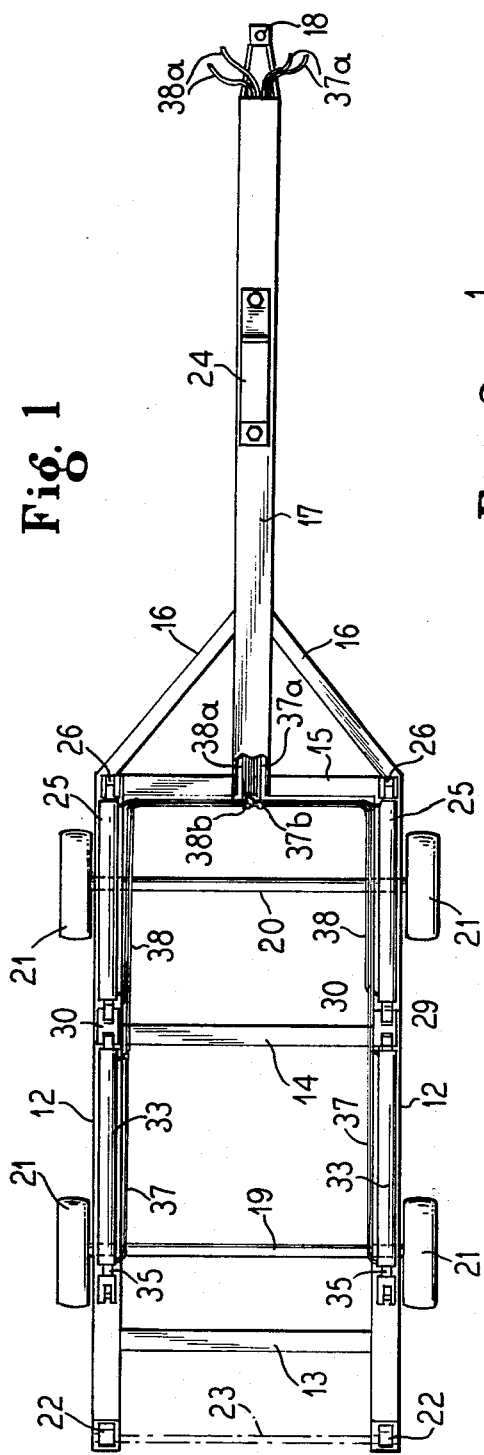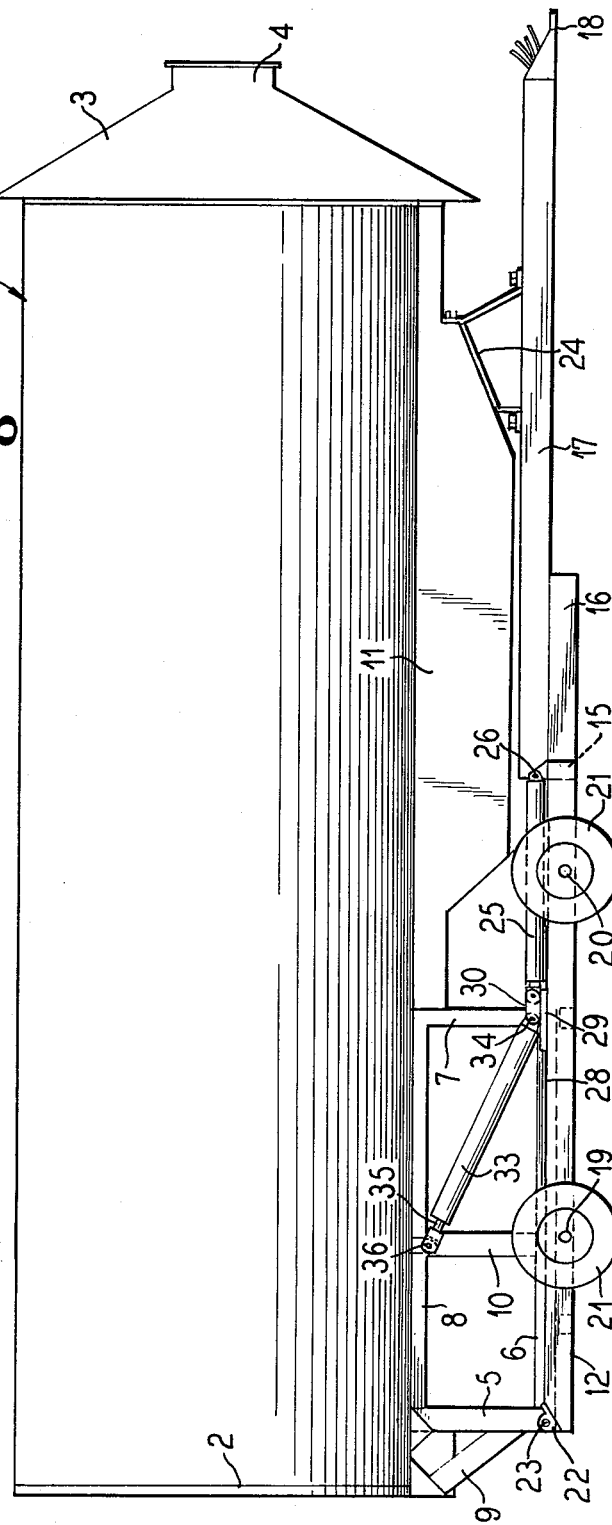

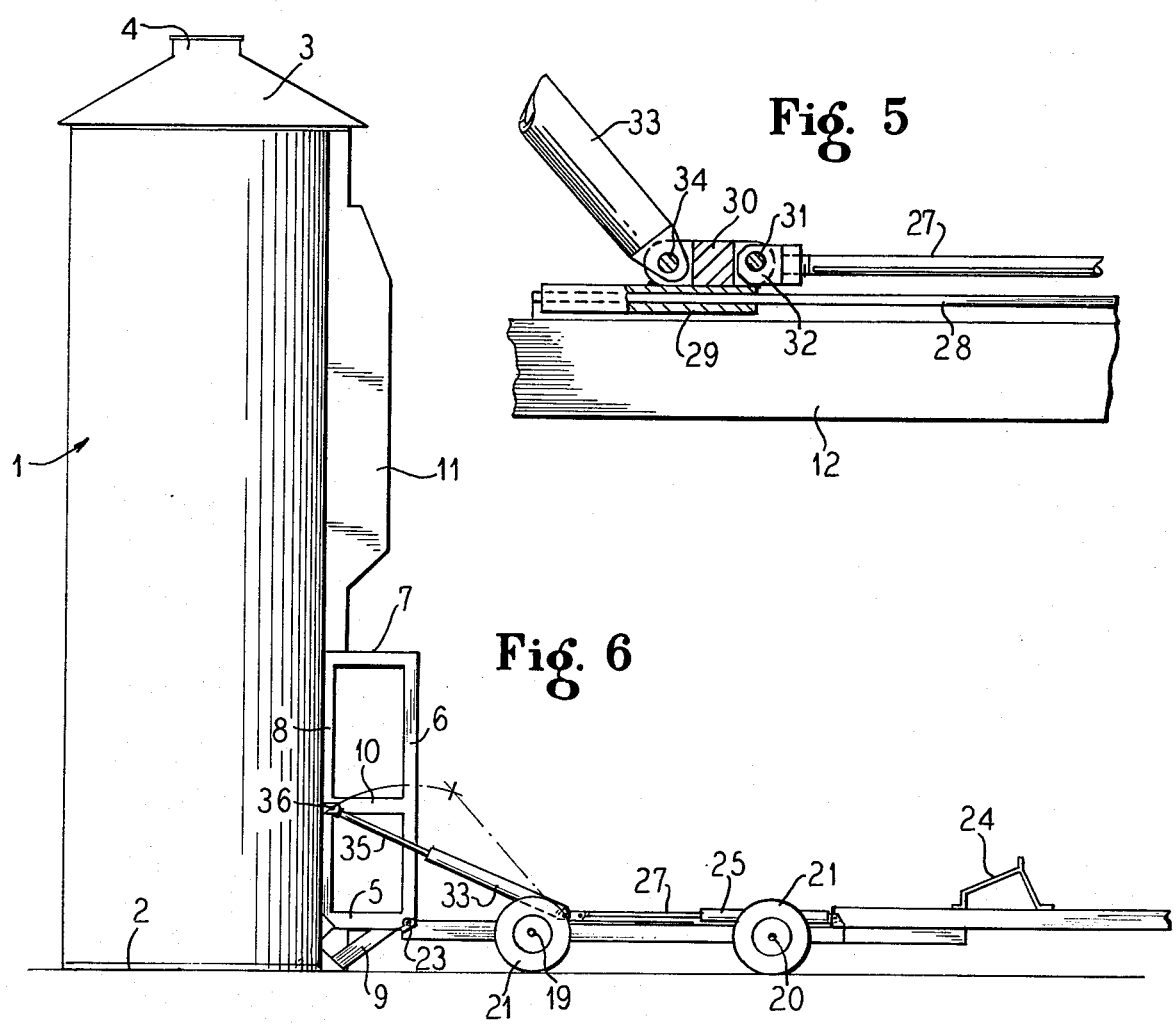

ERECTION MEANS FOR A TRANSPORT TRAILER

PRIOR ART

The most pertinent prior art to the instant invention now known to applicants is our own prior U.S. Pat. No. 3,547,291 issued Dec. 15, 1970, entitled "Transport and Erection Trailer".

While the structure known and described in the aforesaid patent operated and still operates satisfactory for the purpose of setting up the unwieldy load, that load must be stopped and held in an angular position by a pair of hydraulic jacks, one on each side of the trailer frame with the cylinder pivoted to the respective frame side, and the piston rod pivotally connected to one side of the load. A prop rod is pivoted at one end to each side of the frame and the other end of each rod is manually seated in a socket on a part of the load. Then the hydraulic jacks may be released to movement of the piston rod 25 while the pivot point of each jack on the respective side rail is manually changed from one point to another toward the rear end of the trailer to get a more desirable direction of push for the further elevation of the load.

Since corn cribs, silos, grain dryers, etc., have increased in size considerably to comply with the demands, grain dryers having a height of 60 or more feet frequently and a transverse dimension of 12 feet frequently. Consequently, there is a substantial amount of weight when it is considered that they carry two blower fans as well as motors for the fans and an outgoing conveyor for dried grain. The manual placing of the prop rods and change of pivotal connections requires a man on each side of the trailer as well as the man who directs proper positioning upon the premade foundation, and there is a little danger in the event the tractor operator is not paying attention to the control of the hydraulic jacks too well or mechanical trouble develops during that changing of pivot points. It was desired, therefore, to make certain improvements in the trailer of the aforesaid patent, and hence, the present invention.

BRIEF SUMMARY OF THE INVENTION

The instant invention embodies a trailer having an underslung skeleton frame from which a forwardly extending tongue may be connected to a truck or tractor for pulling the trailer. This structure is of generally the character of that shown in our aforesaid patent. However, hand or manual work during the elevation of the load to erect position upon a preformed foundation has been eliminated, and the load in the present invention is elevated entirely by mechanical means. To this end, a T-shaped rail is provided on the upper face of each side frame member and a slidable carriage is mounted on that rail. This carriage has a connection for the end of a projecting piston rod which is a part of the hydraulic jack including a cylinder operable in either direction. The cylinder of another hydraulic jack is pivotably connected to the rear end of the carriage. Accordingly a total of four hydraulic jacks are utilized, which operate in pairs two jacks being opposite each other on the side frame members and a similar paired arrangement of two other jacks are mounted to the rear of the first pair of jacks. When the load is elevated partially a predetermined extent, it is adjustable to change the location of the pivot point for the cylinder of the rear pair of jacks, and this is accomplished by actuating the forward pair of jacks to move the carriages to which the rear cylinders are pivoted along the rail so that the angle of elevation of the rear jacks is such that when they are actuated they are pushing to give a more direct force on the load. The elevation of the load to a vertical position is accomplished by the rear pair of jacks then acting in unison. Thus, the entire elevation of the load is accomplished mechanically. The only remaining operations after the load has been set in an erect position is the disconnection of the load from the trailer frame, and the disconnection of the pivot connections for the rams of the rear jacks from a part of the load. Then the jacks may be laid down along side the frame and the trailer is drawn away from the standing load.

The instant invention is described with a load such as a grain dryer although, other and various loads may be carried.

BRIEF DESCRIPTION OF THE DRAWING FIGURES

FIG. 1 is a top plan view of the trailer without a load, the load being indicated by phantom lines;

FIG. 2 is a side elevational view of the trailer with the load mounted thereon in traveling position;

FIG. 3 is a fragmentary side elevational view showing the load in partially erect position;

FIG. 4 is a fragmentary sectional view taken substantially as indicated by the line IV—IV of FIG. 3;

FIG. 5 is a fragmentary sectional view taken substantially as indicated by the line V—V of FIG. 4; and FIG. 6 is a side elevational view of the load standing in erect position ready for disconnection entirely from the trailer.

DETAILED DESCRIPTION

In view of the fact that the erection means carried by the trailer must be described in connection with a load, one form of a load of the general type that is carried on a trailer of this character will first be described. By way of example therefore, the load in this instance is a grain dryer of the type that might reach 60 feet or over in height. This dryer is generally indicated by numeral 1 is provided with a base 2, a conical cover 3 over the upper end thereof through which grain may be delivered into the dryer through a central opening defined by a neck 4. The grain is delivered to the opening by a suitable elevator. Such, for example as a bucket type of elevator. The dryer is substantially cylindrical with the exception of a housing projecting from one side of the dryer in the lower portion thereof, the frame only of the housing being herein shown, the outer sheathing having been removed for clarity in showing connections to the mechanism carried by the trailer. The housing frame is rectangular in cross section as well as in vertical section, both sides being identically constructed and there being suitable cross pieces between them. This frame on each side includes an outwardly extending base member 5, an upright member 6, a top outwardly extending member 7 and an inside upright member 8. From the base of the dryer body an obliquely extending support 9 engages the outer end of the base member 5 at its junction with the outside upstanding member 6. A central partition 10 separates the housing frame into upper and lower compartments for hot and cool air blowers respectively. Above the housing frame is an outstanding stack 11 in which hot air is conveyed to the interior of the dryer.

The trailer itself is made up of a number of frame members secured together as by welding or an equivalently strong manner and are preferably box-shaped in cross section to maintain lightness. These frame members include side rails 12—12 which are connected to each other by way of a rear cross rail 13, intermediate cross rail 14 and a forward rail 15. A pair of converging frame members 16—16 extend forwardly from adjacent the junction of the forward cross rail 15 with the side rails 12—12 and converge to a point approximately at the axial line of the frame. An elongated tongue 17 is secured to the top of the leading cross rail 15, and is connected to the outer ends of the members 16—16, overlying all these members. The leading end of the tongue is provided with a hitch connection 18.

The entire frame, including the base connection of the tongue, is supported by a pair of spaced rotary shafts 19 and 20, each of which has a wheel 21 secured at each end thereof outside the side frame members through which those two shafts extend. These wheels are preferably rubber tired and are of a relatively small diameter in comparison with commonly known automobile wheels so as to maintain a low height for the trailer and its load for passing under overhead structures. The leading end of the tongue, of course, will be supported in an elevated position by the truck or tractor connected to the same, and which is not shown in the drawings.

When the load is placed upon the trailer in the position seen in FIG. 2, the load is pivotly connected to the frame at the base of the aforesaid housing frame where the lower elements 5 and the upright elements 6 meet and at that point there is a pivot bracket 22 on each side rail 12 at the rear end thereof through which a pivot shaft 23 may be located which provides the stabilizing anchor at the rear end of the load. A forward end portion of the load is stabilized by the bracket 24 placed under the aforesaid stack 11 on the load which bracket is shaped to be bolted in spaced ends to the upper face of the tongue 17, with the angle in the bracket being bolted to the top of the stack of the dryer being carried, as seen clearly in FIG. 2. The elevating means, to be described hereinafter, may also lend some stability to the dryer during travel to its intended permanent location.

The elevating or erection means of the instant invention embody a pair of hydraulic jacks 25—25, one mounted in a flat lying position upon each of the side rails 12—12 of the frame. The forward ends of the cylinders of these jacks are pivotly connected at the ends of the side frame members. However, that pivot connection is not necessary when these jacks are working, but only when there is no load on the trailer and the jacks may need to be removed for attention or replacement and the pivot connection will probably help in that operation. The ram or piston rod 27 of each hydraulic jack 25 is connected in a manner to prevent any pivotable movement when the load is being removed from the trailer.

With reference now to FIGS. 3, 4 and 5, particularly, it will be seen that a T-rail 28 is secured by welding or an equivalent manner to the top of each side rail 12—12 of the frame. A carriage having a lower portion 29 shaped to extend over, downward passed the edge, and inwardly underneath the lateral extensions of the T so that this carriage can only be removed from the rail by sliding it. The carriage has an upper portion 30 which is solid in the center, and bifurcated at each end, with the pivot pin 31 extending laterally through the furcations. In connection with the showing in FIG. 3, it should be noted that the wheels 21 on the near side of the trailer frame have been intentionally removed so that the action in positioning of the carriage 30 can be plainly seen. With reference to FIG. 5 it will be seen that the rams or piston rods 27 of the jacks 25—25 have a flat end portion 32 having a flat stretch at the end thereof disposed so closely to the solid portion 30 of the carrier that there can be no pivotal movement between the ram 27 and the carrier. The rams 27 of each of the jacks 25—25 are prevented from moving in any direction except back and forth in a straight line paralleling the respective frame member 12.

Rearwardly of the hydraulic jacks 25—25 another pair of hydraulic jacks 33—33 is located, one jack on top of the respective side rail of the trailer frame. As seen in FIG. 1, when the trailer is empty, the jacks are laid down and the respective jacks 33—33 will be in alignment with the jacks 25—25. On each side of the trailer frame, the cylinder of the hydraulic jack 33 is connected to the carriage 30 so that the cylinder may pivot relatively to the carriage as indicated at 34, particularly in FIG. 5. When the load is placed upon the trailer, the piston rods or rams 35—35 are each pivotally connected to a bracket 36 on the load housing frame approximately where the cross partition 10 joins the rear upright 8 as seen clearly in FIG. 2. The hydraulic jacks 33—33 so connected on opposite sides of the housing frame, the load is better stabilized during transit on the trailer.

As shown and described more fully in our aforesaid U.S. Pat. No. 3,547,291, the hydraulic pressure lines extend along the inside of the side frames of the trailer and then connect with master lines through the tongue 17, coming out at the far end of the tongue where they are connected to lines on the tractor or truck which pulls the trailer, that tractor or the equivalent not being shown in the drawings. The pulling vehicle carries the mechanism for feeding hydraulic fluid under pressure to either end of each cylinder. Thus, the piston rod of each of the four jacks may be forcefully moved into or out of the cylinder or may be maintained under pressure to hold the load quietly.

These hydraulic pressure lines are shown diagrammatically in the drawings, it being clearly understood that there are two lines for each of the four jack cylinders, one line connected to one end of the cylinder and the other line connected to the other end of the cylinder. The line connections may vary in accordance with the particular mechanism and the valving system in the hydraulic mechanism carried by the vehicle towing the trailer. If the valving system is of a preferred form, a master line may be utilized to control the feeding of presurized fluid into the cylinders 25—25 and another master line may feed presurized fluid into the cylinders 33—33, because each pair of cylinders must act uniformly and with the master line presurized fluid is fed in the same way to each cylinder of a pair. The pressure lines are diagrammatically indicated in FIG. 1, pressure lines 37—37 being for the cylinders 33—33 and pressure lines 38—38 are for the cylinders 25—25. The pressure lines 37—37 come together into a master line 37a running through the inside of the tongue 17, and pressure lines 38—38 connect with master line 38a also running through the tongue. Each of these master lines may be single or two lines 37a and 38a respectively, and they terminate at the forward end of the tongue for connection to the hydraulic mechanism on the pulling vehicle. If the hydraulic mechanism were somewhat sophisticated, a connection at 37b and 38b could be made as indicated and the master lines could then be single lines of fluid feeding both of the lines connected to the cylinders 33—33 and 25—25. In FIG. 4 we have indicated how the pressure lines may be held in position on the inner side of the trailer side frame members 12—12. Lines 37 and 38 are stacked and held in place by a cover 39 bolted to the frame member.

At the very outset when the load is placed upon the trailer by any suitable means the jacks 33—33 are lying flat on top of the side frame members of the trailer frame in tandem relationship with the hydraulic jacks 25—25, both adjacent ends of the respective jacks being pivotally connected to the carriage 30. Then the pivot connections are made at 23 and 36 to the housing frame on the load. The latter connection of the jacks with the pivot points 36 elevate the rearward jacks to the position seen in FIG. 2. At that particular instant jacks 33—33 are disposed on each side of the trailer frame along a line indicated by the imaginary line 40 at which the pivot point 36 would be at point 41 and pivot point 37 would be at point 42. The angle being so low that it would be extremely difficult to raise the awkward load to a standing position. Therefore it is necessary immediately to change the pivot point 34 and the disposition of the jack 33 to more directly lift the load and to this end, the jacks 25—25 are energized so the piston rod thereof moves out and changes the pivot point 34 of the jack 33 by moving the carriage 30 along the rail so the pivot point travels from location 42 back to location 34 which is entirely new location. At such an angle the jacks 33—33 are pointing at almost right angles to the load. Of the pivot points 23, 36 and 34 are then as seen in FIG. 3. The disposition of the pivot points 23, 36 and 34 in the tandem relation of the jacks 33 with the jacks 25 cause an arcuate movement of the pivot point 36 from the position of 41 as indicated by the line 43, this giving more elevation to the load and disposing the jacks 33 substantially at right angles to the load. The added elevation to the load and the better disposition of the jacks 33—33 was all caused by the energization of the jacks 25—25 to change the pivot point 34. The disposition of the pivot points and the tandem relationship of the jacks was accomplished by virtue of the jacks 33—33 having acted as rigid iron bars relative disposition to the pivot rod or ram 35 to the cylinder 33 not having changed in any degree whatever. The next operation may energize the jacks 33—33 to move the piston rods 35 outwardly in a direct push upon the load to swing the load around the pivots 23—23 and set it up in a vertical position as seen in FIG. 6 on the preformed foundation. No manual operates have occurred since the removal of the backet 24, all removal of the load from the trailer and setting it up in an erect position done mechanically. It is not until the load has been set up that any further manual operations occur such as releasing the pivot at 33 and the pivot at 36 so the trailer may move away.

During the foregoing operation it may be possible for a skilled operator to combine the movement of change of pivot point and the movement of elevating the load around the pivot 23 by virtue of the jacks 33—33 a permitted combination of these two movements by portion of each being done at the same time or various other movements dependent upon the sophistication of the hydraulic valve arrangement and the skill of the operator. The construction of the carrier 30 and its grip upon the T-rail 29 eliminates all manual operations during the erection and placement of the load, and the T-rail 29 need not be any longer than the carrier need be moved.

We claim:

1. Erection means for a transport trailer of the type having a frame with side rails and a forwardly projecting tongue adapted to be connected to a tractor to support an elongated object of large cross section in horizontal position and deliver the object in upright position which comprises carriages slidable along the length of said side rails, a pair of forward hydraulic jacks arranged one on each side rail, a pair of rearward hydraulic jacks arranged in tandem with said forward pair to cooperate therewith in elevating and delivering the object on the trailer, said forward hydraulic jacks each having a piston rod connected to a carriage for propelling the carriages along the length of said side rails, said rearward pair of hydraulic jacks each having a cylinder pivoted to a carriage, said rearward pair of jacks each having a piston rod projecting from the free end of the cylinder, means for pivotally connecting the rear end of said trailer with said object, means for pivotally connecting the piston rods of said rearward pair of jacks to said object forwardly of and at a level above said means for pivotally connecting the object to said trailer, and means for energizing said forward and rearward pairs of jacks to propel said carriages rearwardly for increasing the angle of inclination of said rearward pair of jacks to apply a more direct lifting load to the object and for propelling the piston rods out of the cylinders of the rearward pair of jacks to swing the object about the means for pivotally connecting the rear end of the trailer with said object to deposit the object in an upright position behind the trailer.

2. The erection means of claim 1 wherein the supported device is a large cylindrical object having a laterally projecting frame and the means for pivotally connecting the trailer with the object connects the outer bottom end of this frame to the rear end of the trailer.

3. The erection means of claim 2 wherein the pivot means connecting the piston rods of the rear pair of jacks is located on said laterally projecting frame adjacent the cylindrical object and longitudinally spaced from said pivot means connecting the frame to the trailer.

4. The erection means of claim 1 wherein said side rails have T-rails mounted on the tops thereof and said carriages embrace and ride on said T-rails.

5. The erection means of claim 1 wherein the means pivotally connecting the rear end of the trailer with the object is separable to detach the object from the vehicle.

6. The erection means of claim 1 including means for supplying hydraulic fluid equally to the jacks of each pair of jacks to move the jacks of each pair in unison.

7. The erection means of claim 6 including means for simultaneously actuating both pairs of jacks to propel the carriages rearwardly and extend the piston rods of the rearward pair of jacks.

* * * * *